(12) United States Patent
Rogers

(10) Patent No.: US 6,257,670 B1
(45) Date of Patent: Jul. 10, 2001

(54) SIDE DUMP TRAILER

(75) Inventor: Ralph R. Rogers, Dakota Dunes, SD (US)

(73) Assignee: Thurston Mfg. Co., Thurston, NE (US)

( * ) Notice: Subject to any disclaimer, the term of this patent is extended or adjusted under 35 U.S.C. 154(b) by 0 days.

(21) Appl. No.: 09/540,354

(22) Filed: Mar. 31, 2000

(51) Int. Cl.⁷ ....................................................... B60P 1/16
(52) U.S. Cl. ............................................. 298/18; 298/22 J
(58) Field of Search ........................... 298/17.7, 18, 22 J, 298/22 P, 22 D, 13

(56) References Cited

U.S. PATENT DOCUMENTS

| | | | |
|---|---|---|---|
| 3,323,838 | * | 6/1967 | Trucco et al. ............................ 298/18 |
| 3,694,840 | * | 10/1972 | Loblick ........................... 298/22 J X |
| 3,784,162 | * | 1/1974 | Channell et al. ................ 298/22 J X |
| 3,871,706 | * | 3/1975 | Odom .............................. 298/22 J X |
| 4,019,781 | * | 4/1977 | Ray ...................................... 298/22 J |
| 4,161,338 | * | 7/1979 | Brown ................................. 298/22 J |
| 5,480,214 | * | 1/1996 | Rogers ............................... 298/18 X |
| 5,597,211 | * | 1/1997 | Golden ............................... 298/17.6 |
| 5,845,971 | | 12/1998 | Rogers ................................... 298/18 |
| 5,967,615 | * | 10/1999 | Rogers ................................... 298/18 |
| 6,106,072 | * | 8/2000 | Lutter, Jr. ........................... 298/17.7 |

* cited by examiner

*Primary Examiner*—Stephen T. Gordon
(74) *Attorney, Agent, or Firm*—Zarley, McKee, Thomte Voorhees & Sease; Dennis L. Thomte

(57) ABSTRACT

A side dump trailer comprising a trailer body pivotally mounted on a wheeled frame to enable the material within the trailer body to be dumped from one side of the trailer. The body is pivotally moved with respect to the wheeled frame by means of a plurality of horizontally spaced-apart scissor lift assemblies positioned beneath the body of the trailer.

2 Claims, 4 Drawing Sheets

SIDE DUMP TRAILER

BACKGROUND OF THE INVENTION

1. Field of the Invention

This invention relates to a side dump trailer and more particularly to a side dump trailer which may be used to haul elongated rod members, spool members or loose bulkhead materials such as scrap metal. Further, this invention relates to a side dump trailer wherein the body thereof is pivotally moved between its non-dumping position to its dumping position by means of a plurality of scissor lift assemblies positioned below the body. Further, the invention relates to an improved body configuration for increasing the hauling capacity thereof.

2. Description of the Related Art

Trailers have been used for many years to haul rock, gravel, dirt, rip rap, break-out, etc. One type of trailer previously used is one having an end gate at the rearward end thereof so that the contents of the trailer may be dumped from the rear of the trailer as the forward end of the trailer body is elevated by means of a hydraulic cylinder or the like. One problem associated with a rear tail gate is that the materials in the trailer tend to become clogged at the tail gate area. Further, tailgates sometimes do not fully open or fully close. End dump bodies are also prone to high wear as all material slides down the body surface.

In an effort to overcome some of the disadvantages associated with rear dumping trailers, side dump trailers have been provided. One type of side dump trailer is disclosed in U.S. Pat. No. 4,494,798 issued to Clarence W. Bailey on Jan. 22, 1985. Another type of side dump trailer is disclosed in U.S. Pat. No. 5,480,214 issued to the applicant herein on Jan. 2, 1996. Although applicant's earlier design has met with considerable success, the same was primarily designed for use in hauling loose materials such as gravel, rock, rip rap, break-out, etc.

It has been discovered that a unique situation exists in the steel manufacturing business. For example, many small steel mills have scrap metals delivered thereto by means of trucks or the like. The steel mills convert the scrap metals to elongated rods, bars or coils of steel wound upon spool members. It takes a rather unique type of transport vehicle to transport the elongated rods or steel coils from the factory to the customers for the products. Inasmuch as the trucks which hauled the loose scrap metals to the steel mills are not suitable for transporting the elongated rods or steel coils, different types of trucks are required to transport the finished products. In other words, one type of truck delivers the scrap materials to the steel mill and another type of truck hauls the finished products from the steel mills. In such a situation, the trucks hauling the scrap metals to the steel mills return from the steel mills empty and the trucks hauling the finished products travel to the steel mills empty.

In an effort to solve the above-identified problems, applicant designed a side dump trailer which is the subject of U.S. Pat. No. 5,845,971. Although the trailer of U.S. Pat. No. 5,845,971 represents a distinct improvement in the prior art, it has been found that it is more economical and efficient to pivotally move the body of the trailer by means of a plurality of spaced-apart scissor lift assemblies rather than the multistage hydraulic cylinders utilized in U.S. Pat. No. 5,845,971. It has also been ascertained that the carrying capacity of the trailer can be increased if one of the side walls of the trailer extends vertically rather than upwardly and outwardly from the bottom wall.

SUMMARY OF THE INVENTION

A side dump trailer has been provided which includes an elongated wheeled frame having a plurality of horizontally spaced-apart supports thereon at one side thereof. An elongated body is movably positioned on the wheeled frame and includes a bottom wall, a first side wall extending upwardly and outwardly therefrom, and a second side wall which extends substantially vertically upwardly from the bottom wall at the second side of the body. A plurality of horizontally spaced-apart pivot pins are secured to and positioned at the outer surface of the first side wall of the body which are pivotally mounted in the first supports. A plurality of horizontally spaced-apart scissor lift assemblies are connected to the wheeled frame and the body for selectively pivotally moving the body about the pivot pins so that the body may be selectively moved from a non-dumping position to a dumping position.

It is therefore a principal object of the invention to provide an improved side dump trailer.

Yet another object of the invention is to provide a side dump trailer wherein the body thereof is pivotally moved between its non-dumping position and its dumping position by means of a plurality of scissor lift assemblies.

Still another object of the invention is to provide an improved side dump trailer having increased carrying capacity.

Still another object of the invention is to provide a side dump trailer which is durable in use.

These and other objects will be apparent to those skilled in the art.

DESCRIPTION OF THE PREFERRED EMBODIMENT

Figure 1:
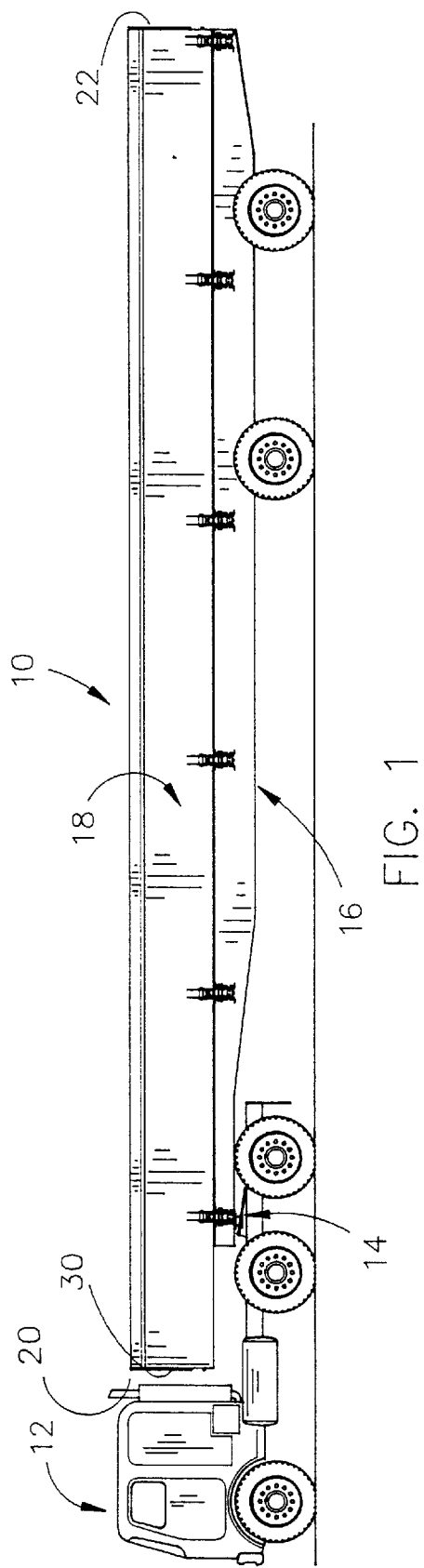
FIG. 1 is a side view as seen from the left side of the side dump trailer of this invention.

The numeral 10 refers generally to the side dump trailer of this invention. Although the drawings illustrate that the side dump trailer 10 is being pulled by a truck 12 having a fifth wheel 14, trailer 10 could be mounted on any suitable truck frame. Trailer 10 includes a wheeled frame 16 having a body 18 mounted thereon, as will be described in more detail hereinafter. For purposes of description, body 18 will be described as including a forward end 20 and a rearward end 22. Body 18 also includes bottom wall 23 and side walls 24 and 26. Side wall 24 extends upwardly and outwardly with respect to bottom wall 23 while side wall 26 extends substantially vertically upwardly from bottom wall 23. The fact that the side wall 26 extends substantially vertically upwardly from bottom wall 23, rather than upwardly and outwardly as does side wall 24, substantially increases the hauling or carrying capacity of the body 18.

Figure 2:
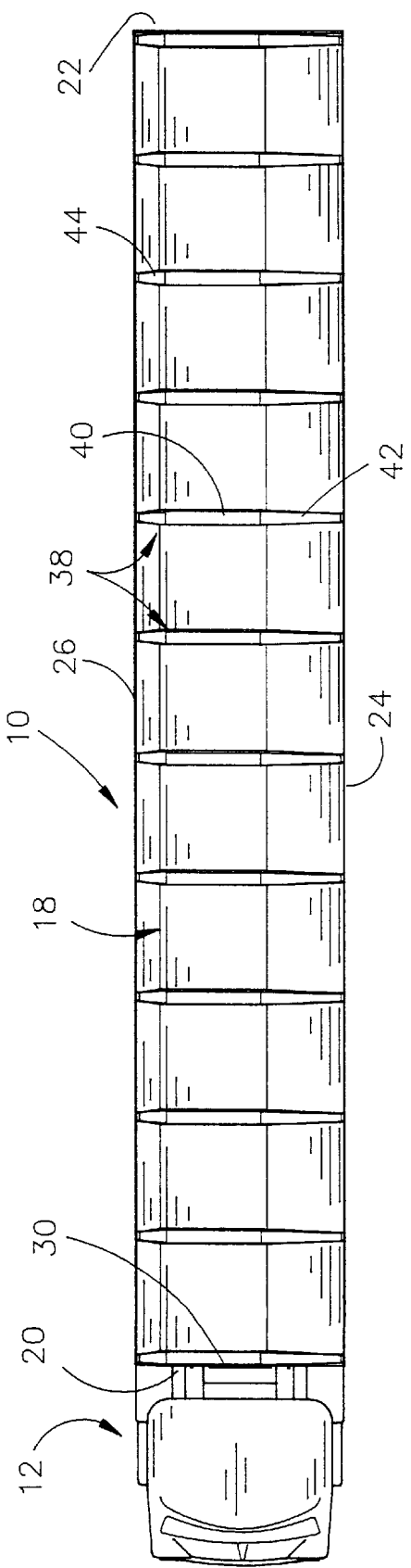
FIG. 2 is a top view of the side dump trailer of this invention.
Figure 3:
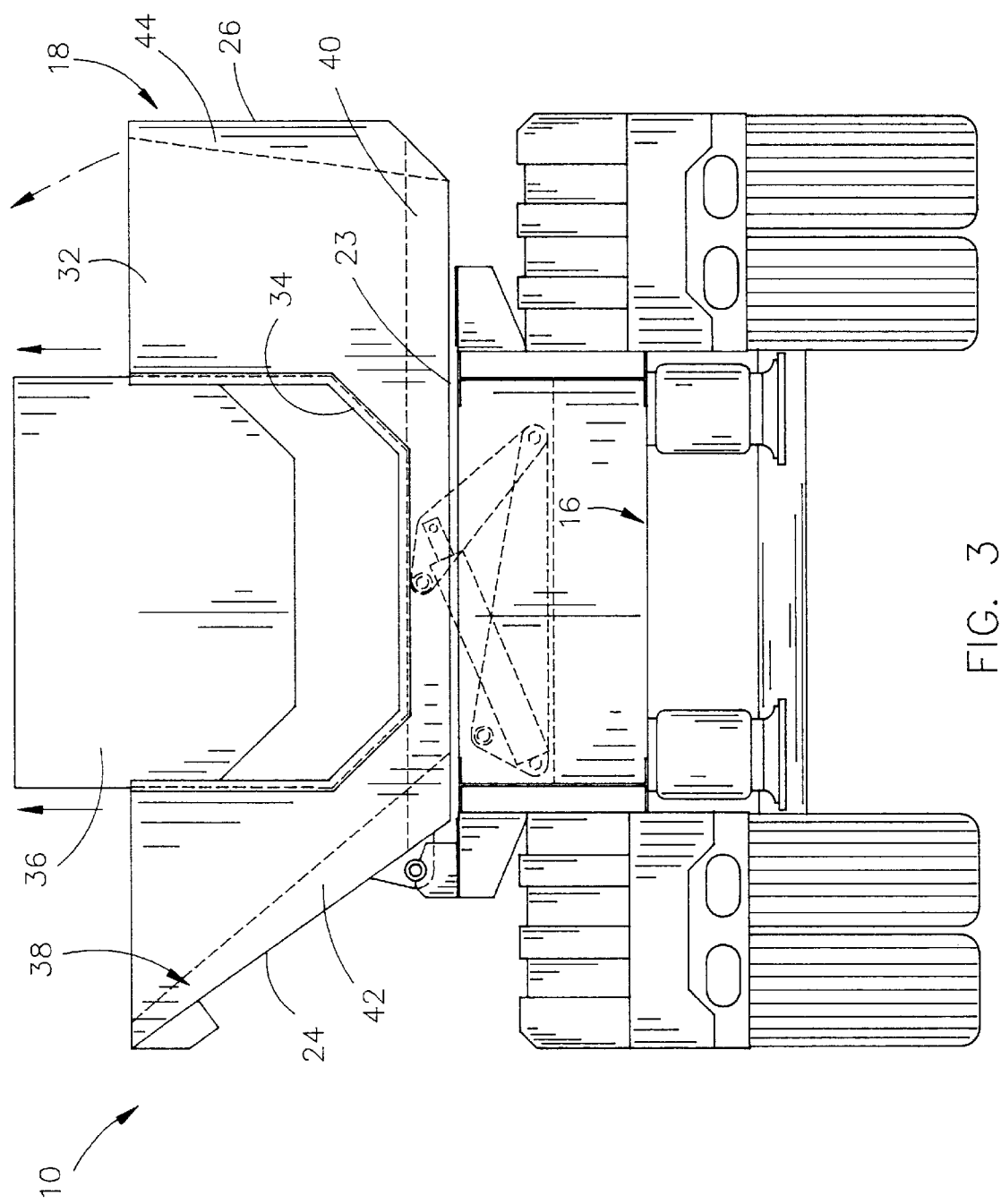
FIG. 3 is a rear elevational view of the side dump trailer of this invention.
Figure 4:
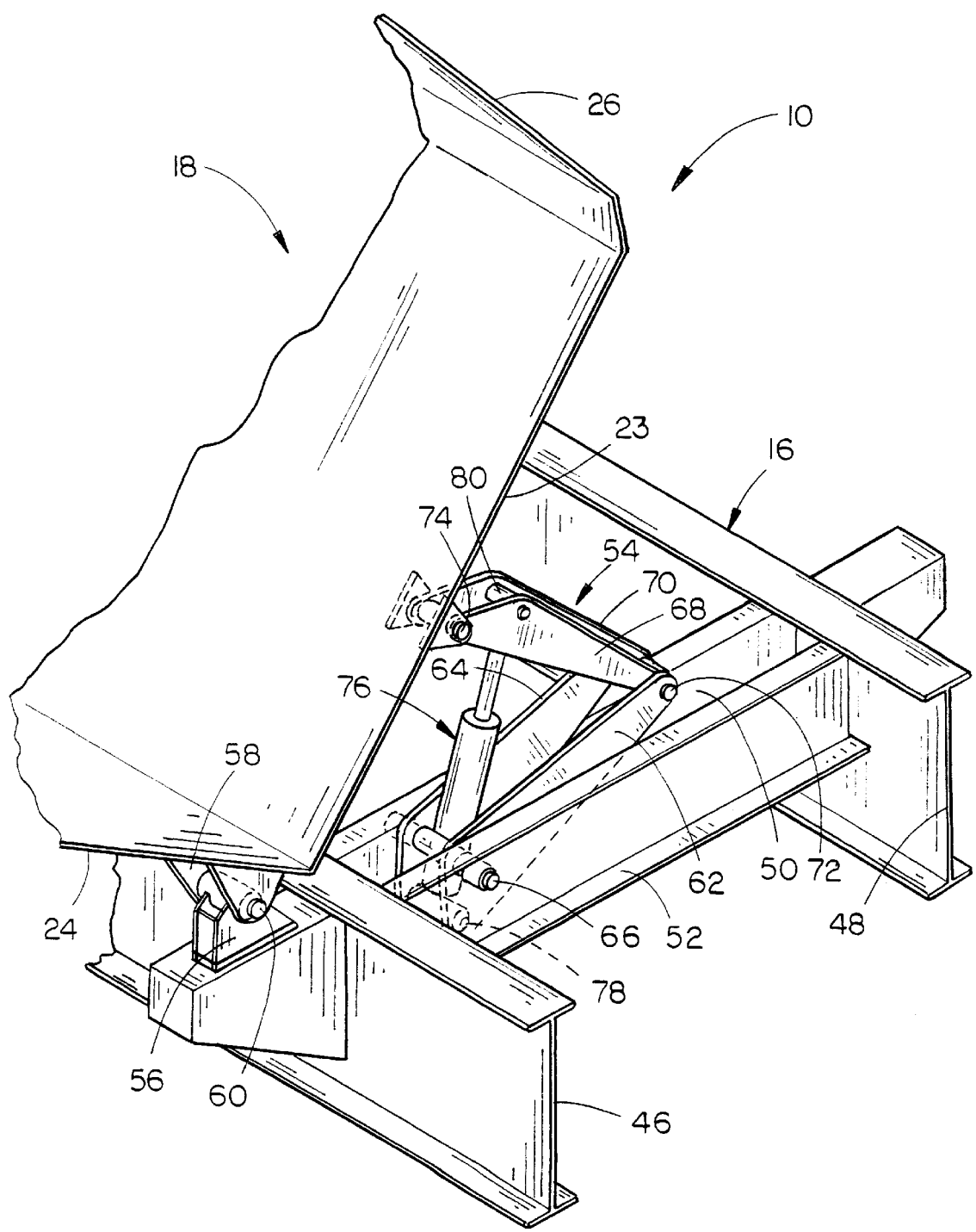
FIG. 4 is a partial rear perspective view illustrating one of the scissor lift assemblies and its relationship to the body and frame.

The forward end of body 18 is defined from a front bulkhead 30 while the rearward end of body 18 is defined by a rear bulkhead 32. As seen in FIG. 3, rear bulkhead 32 is provided with an opening referred to generally by the reference numeral 34 which is adapted to receive a rear gate 36 therein to close the rear bulkhead 32. If desired, the front bulkhead 30 may also be provided with an opening formed therein which is closed by a gate in the same fashion as rear bulkhead 32. Body 18 is provided with a plurality of horizontally spaced-apart ribs provided in the interior thereof and which are generally referred to by the reference numeral 38. As seen in FIGS. 2 and 3, each of the ribs 38 includes a bottom rib portion 40 which extends upwardly from bottom wall 23, side rib portion 42 which extends inwardly from the interior surface of side wall 24, and side portion 44 which extends inwardly from side wall 26. The ribs 38 form a generally U-shaped rib which not only adds reinforcement to the body 18, but which provides a support for positioning elongated rods thereon. Further, spools of wire material may also be supported between the ribs 38.

Wheeled frame 16 includes at least a pair of longitudinally extending frame members 46 and 48 having a plurality of transversely extending cross frame members 50 and 52 arranged in pairs and which extend between the frame members 46 and 48 in those locations where scissor lift assemblies 54 are to be located. A plurality of horizontally spaced-apart supports 56 are secured at one side of frame member 46 and are pivotally connected to the supports 58 positioned at the outer surface of side wall 24 by means of pivot pins 60.

Each of the scissor lift assemblies 54 comprises a pair of horizontally spaced-apart and vertically disposed lift arms 62 and 64 which are positioned between the cross frame members 50 and 52 and which are pivotally secured thereto by means of pin 66. Lift arms 68 and 70 have one end thereof positioned between the ends of lift arms 62 and 64 and are pivotally secured thereto by means of pivot pin 72. The other ends of lift arms 68 and 70 are pivotally connected to the underside of bottom wall 23 by means of pivot pin 74. The base end of power cylinder 76 is connected to the lift arms 62 and 64 at 78 which is located below pivot pin 66. The rod end of power cylinder 76 is pivotally connected to the lift arms 68 and 70 at 80. The power cylinders may be either hydraulically operated or pneumatically operated.

Figure 5:
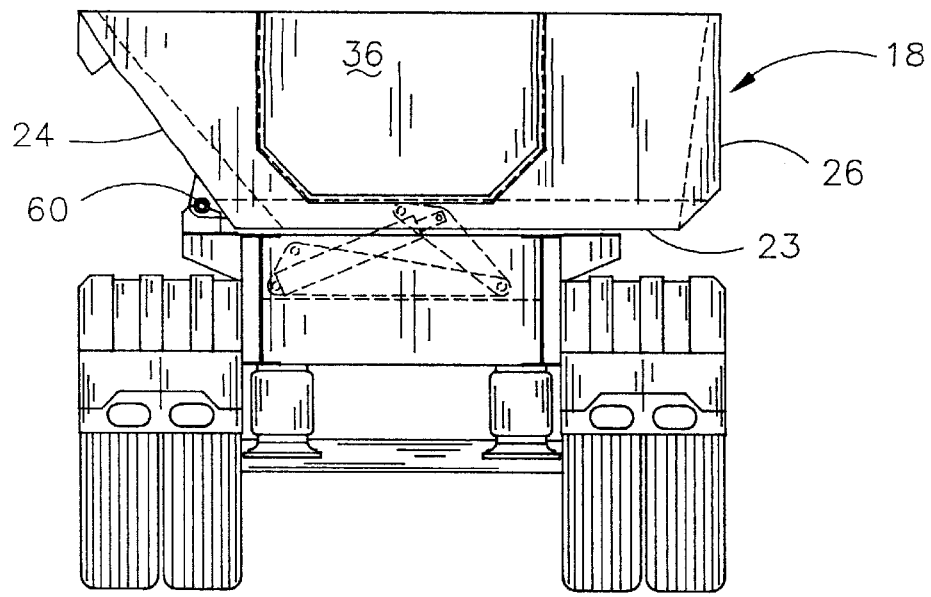
FIG. 5 is a rear elevational view illustrating the side dump body in its non-dumping position.
Figure 6:
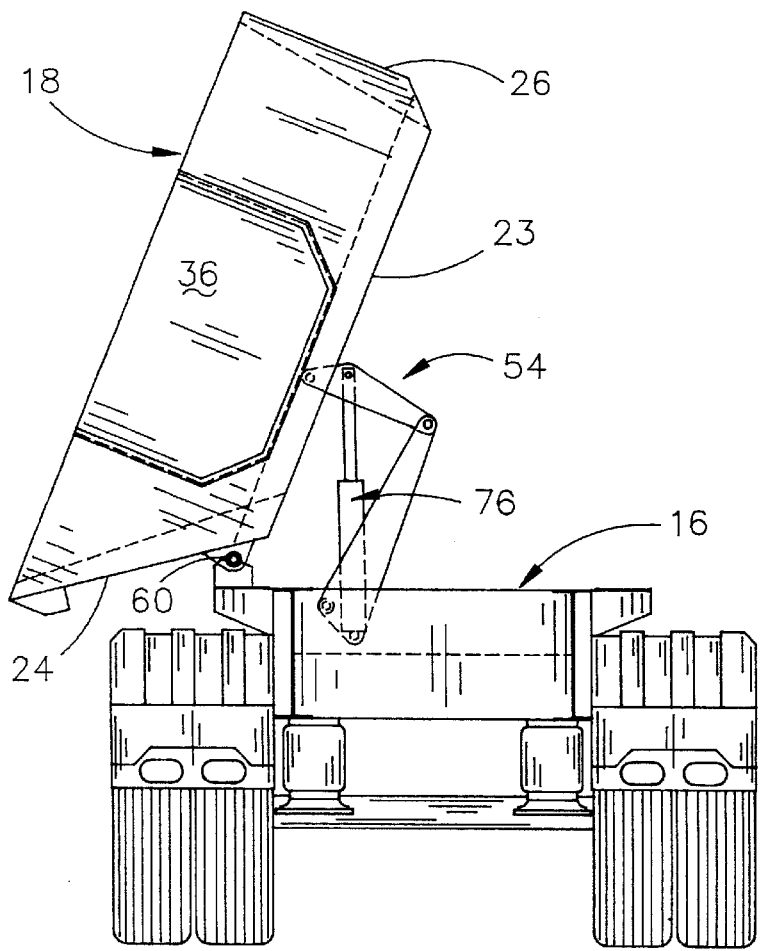
FIG. 6 is a view similar to FIG. 5 except that the body has been pivotally moved to its dumping position.

When it is desired to use the side dump trailer of this invention to haul loose bulk materials such as scrap metals or the like, the end gates are installed in the forward and rearward bulkheads to close the openings therein. The loose bulk materials are then simply dumped into the interior of the body 18 through the open upper end to enable the interior thereof to be filled with the loose bulk materials. The trailer is then driven to the steel mill or the like and the loose bulk materials may be dumped from the left side thereof by causing the hydraulic cylinder 76 to be extended to cause the lift arms of the scissor lift assemblies 54 to cause the body 18 to pivotally move from the non-dumping position illustrated in FIG. 5 to the dumping position illustrated in FIG. 6. As the hydraulic cylinders 76 are extended, the body pivots about the pins 60 which interconnect the supports 56 and 58 spaced along the exterior surface of the body. When the materials have been dumped from the side dump trailer, the hydraulic cylinders 76 are then retracted to return the body to its non-dumping position. At that time, if it is desired to transport elongated rod members from the steel mill to a customer, the elongated rod members are positioned in the interior of the body so as to be supported on the ribs 38. As the rod members are being transported to the customer, the end gates would normally close the forward and rearward bulkheads of the trailer. However, if the rod members are longer than the body 18, the end gates may be removed with the ends of the rod members being extended through the end gate openings.

When the trailer arrives at the customer's location, the elongated rod members may be dumped from the body 18 by simply extending the hydraulic cylinders 76, as previously described, so that the elongated members will roll from the ribs 38 in the body 18.

If the trailer is used to transport coils of steel from the factory to the customer, rather than the elongated rod members, the coils of steel are placed between the ribs 38 in an end-to-end fashion.

The use of the scissor lift assemblies rather than the telescopic power assemblies of U.S. Pat. No. 5,845,971 results in considerable savings in that the scissor lift assemblies are considerably cheaper to manufacture than the telescopic multi-stage cylinders of the '971 patent. Further, the scissor lift assemblies 54 are cheaper to build than are the telescopic multi-stage cylinders. As stated before, the fact that the side wall 26 extends substantially vertically upwardly from bottom wall 23 increases the carrying capacity of the body.

Thus it can be seen that the invention accomplishes at least all of its stated objectives.

I claim:

1. A side dump trailer, comprising:

an elongated wheeled frame having a forward end, a rearward end, and first and second sides;

a plurality of horizontally spaced-apart supports on said wheeled frame at said first side thereof;

an elongated body movably positioned on said wheeled frame and having a forward end, a rearward end, and first and second sides;

said body including a bottom wall, a first side wall extending upwardly and outwardly from said bottom wall at said first side of said body at said first side of said wheeled frame, and a second side wall extend upwardly from said bottom wall at said second side of said body at said second side of said wheeled frame;

said first and second side walls having inner and outer surfaces;

a plurality of horizontally spaced-apart pivot pins secured to and positioned at said outer surface of said first side wall of said body which are pivotally mounted in said supports;

and a plurality of horizontally spaced-apart scissor lift assemblies operatively connected to said wheeled frame and said body for selectively pivotally moving said body about said pivot pins, whereby said body may be selectively moved from a non-dumping position to a dumping position;

said wheeled frame comprising first and second longitudinally extending frame members which have spaced-apart first and second cross members, having first and second ends, secured thereto and extending therebetween at each scissor lift assembly location;

each of said scissor lift assemblies comprising horizontally spaced-apart and vertically disposed first and second lift arms positioned between respective one of said first and second cross members;

said first and second lift arms having first and second ends;

said first ends of said first and second lift arms being pivotally secure to said respective first and second cross members;

horizontally spaced-apart and vertically disposed third and fourth lift arms having first and second ends;

said first ends of said third and fourth lift arms being pivotally secured to said second ends of said first and second lift arms;

said second ends of said third and fourth lift arms being pivotally secured to said bottom wall of said body;

a power cylinder having a base end and a rod end;

said base end of said power cylinder being positioned between said first and second lift arms and being pivotally secured thereto below the pivotal connection of said first and second lift arms to said first and second cross members;

said rod end of said power cylinder being positioned between said third and fourth lift arms and being pivotally secured thereto;

the extension of the power cylinders of said scissor lift assemblies causing said body to be pivotally moved from its said non-dumping position to its said dumping position;

the retraction of the power cylinders of said scissor lift assemblies causing said body to be pivotally moved from its said dumping position to its said non-dumping position.

2. A side dump trailer, comprising:

an elongated wheeled frame having a forward end, a rearward end, and first and second sides;

a plurality of horizontally spaced-apart supports on said wheeled frame at said first side thereof;

an elongated body movably positioned on said wheeled frame and having a forward end, a rearward end, and first end second sides;

said body including a bottom wall and first and second side walls;

said first and second side walls having inner and outer surfaces;

a plurality of horizontally spaced-apart pivot pins secured to and positioned at said outer surface of said first side wall of said body which are pivotally mounted in said supports;

and a plurality of horizontally spaced-apart scissor lift assemblies operatively connected to said wheeled frame and said body for selectvely pivotally moving said body about said pivot pins, whereby said body may be selectively moved from a non-dumping position to a dumping position;

said wheeled frame comprising first and second longitudinally extending frame members which have spaced-apart first and second cross members, having first and second ends, secured thereto and extending therebetween at each scissor lift assembly location;

each of said scissor lift assemblies comprising horizontally spaced-apart and vertically disposed first and second lift arms positioned between respective ones of said and second cross members;

said first and second lift arms having first and second ends;

said first ends of said first and second lift arms being pivotally secured to said respective first and second cross members;

horizontally spaced-apart and vertically disposed third and fourth lift arms having first and second ends;

said first ends of said third and fourth lift arms being pivotally secured to said second ends of said first and second lift arms;

said second ends of said third and fourth lift arms being pivotally secured to said bottom wall of said body;

a power cylinder having a base end and a rod end;

said base end of said power cylinder being positioned between said first and second lift arms and being pivotally secured thereto below the pivotal connection of said first and second lift arms to said first and second cross members;

said rod end of said power cylinder being positioned between said third and fourth lift arms and being pivotally secured thereto;

the extension of the power cylinders of said scissor lift assemblies causing said body to be pivotally moved from its said non-dumping position to its said dumping position;

the retraction of the power cylinders of said scissor lift assemblies causing said body to be pivotally moved from its said dumping position to its said non-dumping position.

* * * * *